May 30, 1967
G. E. LUSK
3,322,883
PREFILLED CABLE TERMINATION SYSTEM
Filed May 3, 1966
3 Sheets-Sheet 1
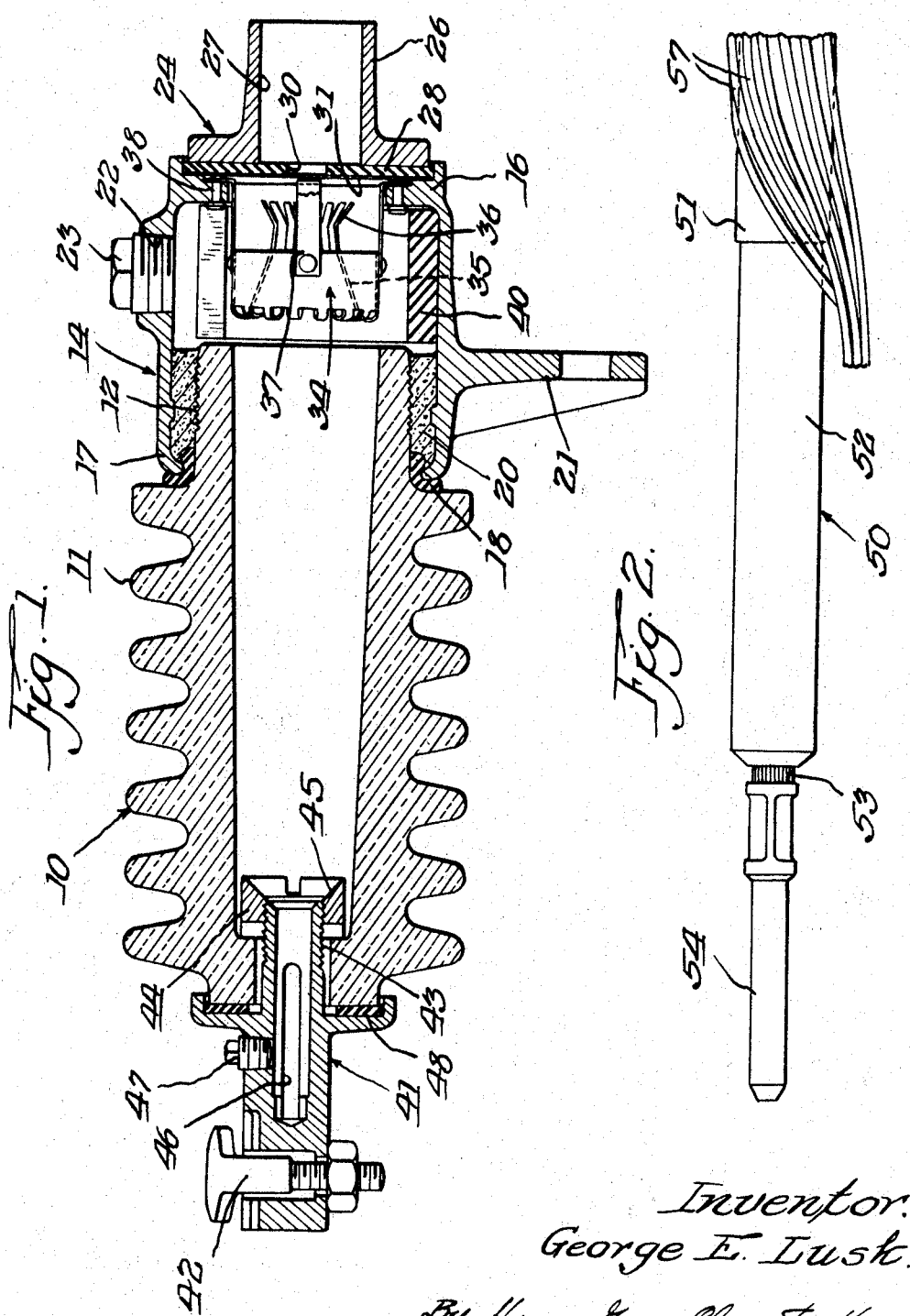
Inventor.
George E. Lusk.
By Hume Groen Clement & Hume
Attys.

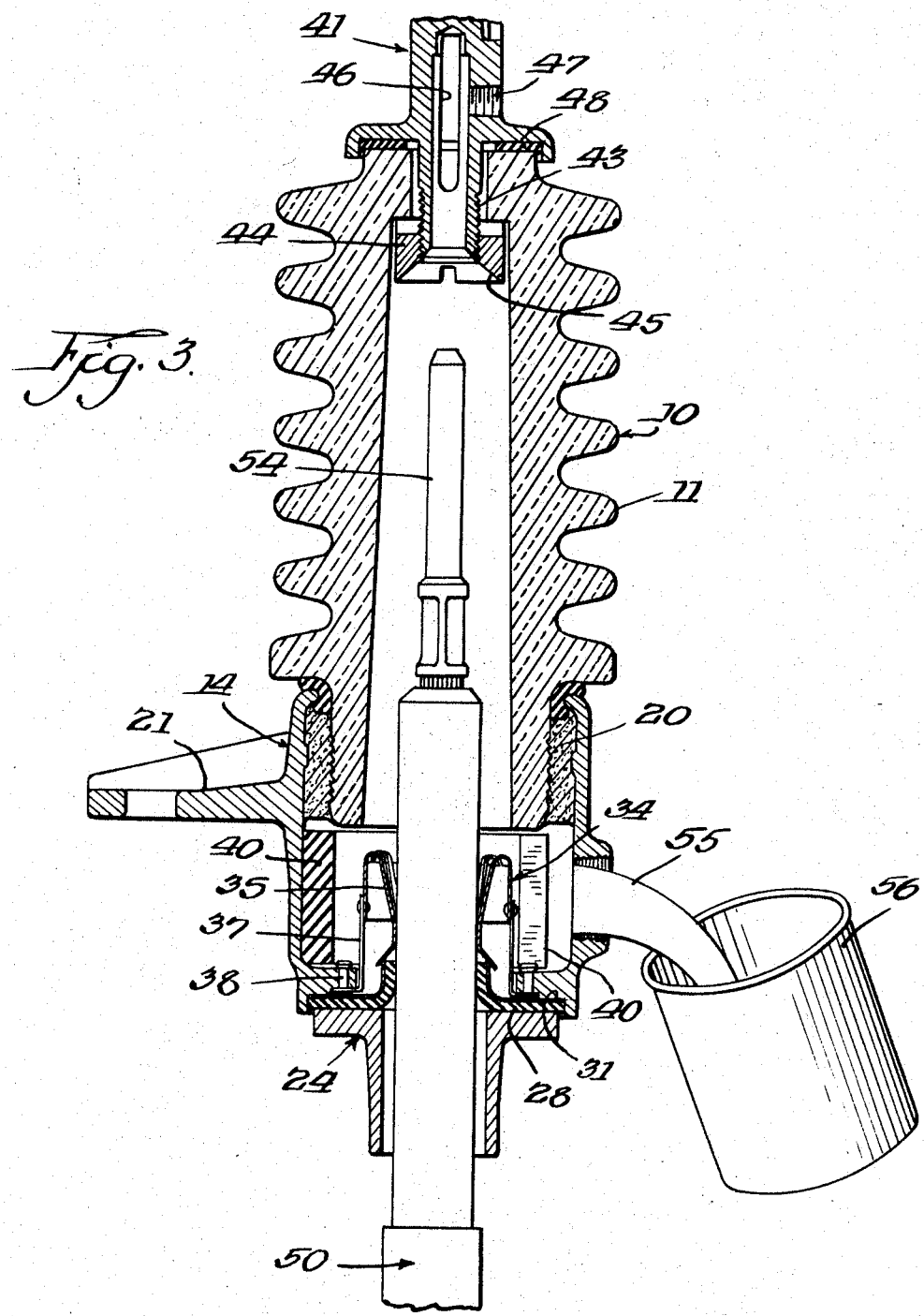

Inventor.
George E. Lusk.

By Hume Groen Clement & Hume
Attys.

United States Patent Office 3,322,883
Patented May 30, 1967

3,322,883
PREFILLED CABLE TERMINATION SYSTEM
George E. Lusk, Downers Grove, Ill., assignor to G & W
Electric Specialty Company, Blue Island, Ill., a corporation of Illinois
Filed May 3, 1966, Ser. No. 547,261
6 Claims. (Cl. 174—73)

The invention relates generally to cable termination systems and has reference in particular to a cable terminator especially designed for polyethylene insulated cables and other plastic insulated cables, and wherein all of the necessary components are factory assembled and so designed that a termination system can be installed in the field without the need of special skills or equipment.

In the termination of higher voltage electric cables, it is a well known expedient to build up a stress relief cone to increase the effective diameter of the cable at the point where the cable is terminated. This larger diameter at the point of termination reduces the electrical stress concentration to a safe operating level.

Prior art stress relief cones have been laboriously built up by hand wrapping dielectric tapes around the cable until a cone of the proper contour and dimensions has been constructed. A conductive shielding tape is then wrapped around the cone so as to extend from the cable shielding to the point of maximum diameter. Not only is the build-up of stress relief cones by this taping procedure laborious and expensive, but it also requires a special skill which is not always available at the time and place where the termination is to be made. In addition, terminators of this type usually required filling at the time of installation with hot potting compounds.

The principal object of the invention is to improve and simplify the terminating arrangement for plastic insulated electric cables so that the same can be installed in the field and without the need of special skills or equipment, or the use of hot potting compounds. In accordance with the invention a factory assembled terminator is delivered to the job in the field and which has been prefilled with an insulating compound, the compound being sealed within the terminator by the sealing of the cable entrance opening and other openings in the terminator. At the job, the factory assembled terminator is used by the lineman in a termination system which merely requires that the lineman remove the semi-conductive shield of the cable for a specified distance, attach a connector to the cable conductor in a manner well known to the art, and then insert the prepared end of the cable within the prefilled terminator, allowing the excess insulating compound to flow out of the terminator through an opening provided for this purpose. An elastomeric diaphragm maintains a running seal with the cable and as the cable progressively enters the terminator bore an equal amount of the compound is displaced and discharged through the body sealing plug opening. Upon insertion of the cable to its full extent it is electrically connected to the hoodnut, the body sealing plug is re-installed and with the securing of the concentric cable wires the termination is completed.

Another object of the invention is to provide a factory assembled and prefilled terminator which will incorporate a tress relief contact shield preferably made of beryllium copper alloy, or other conductive spring metal and which will be stamped and formed to the proper contour for telescoping relation with the prepared end of the cable when the same is inserted in the prefilled terminator.

Another object is to provide a factory assembled terminator which will be prefilled with a special compound that is thixotropic within the operating temperature range of the cable insulation and which will have a dielectric constant closely approximating that of the plastic used for the cable insulation. This provides a dielectrically compatable system of isotropic nature.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a longitudinal sectional view taken approxiamtely centrally of a factory assembled terminator, the same containing an insulating compound and which is sealed within the terminator in accordance with the invention;

FIGURE 2 is an elevational view of the termination end of a power cable showing the same in prepared form before it is inserted within the terminator of FIGURE 1;

FIGURE 3 is a sectional view of the factory assembled terminator of FIGURE 1 with the termination end of the power cable partly inserted theren.

Figure 4:
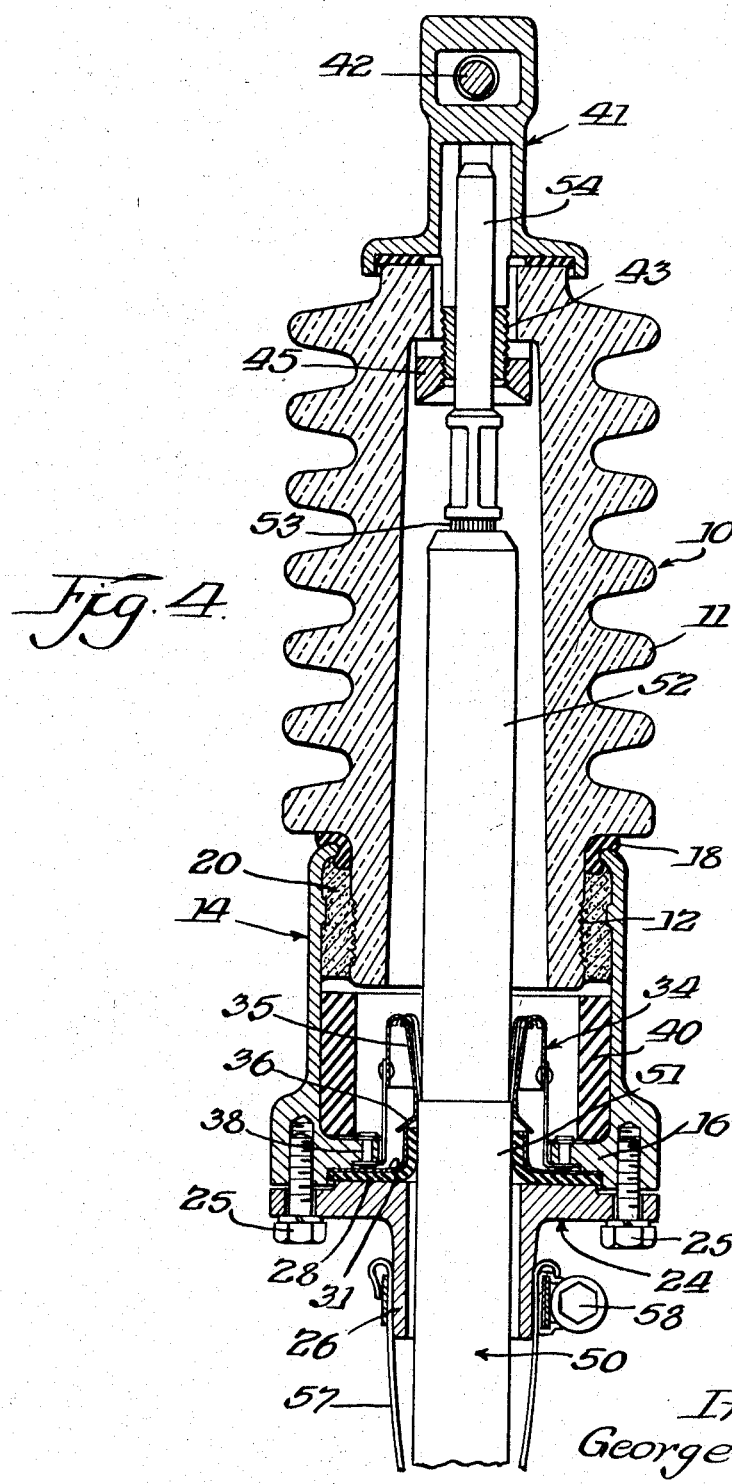
FIGURE 4 is a sectional view similar to FIGURE 3 but taken on a different diameter and showing the termination end of the power cable fully inserted in the terminator and with the concentric cable wires secured so as to complete the termination.

FIGURE 1 shows a factory asembled terminator such as contemplated by the invention and wherein the numeral 10 indicates an insulator formed of any suitable ceramic or glass material and having projecting skirts 11 and serrations 12. The metal base member 14 is combined with the insulator 10 to form the shell of the terminator, the said base member comprising a casting having a reinforced bottom section 16 and a top end which is curved inwardly at 17 for contact with the resilient basket 18. By means of the cementing material 20 the insulator and the base member are physically connected and the parts are sealed by said material and by the gasket. A securing flange 21 is formed integral with the base member 14 by means of which the terminator structure may be secured in place to a fixed support. The base member 14 also has an opening 22 formed therein and which is threaded for receiving the closure plug 23.

The sealing plate 24 of aluminum or other suitable metal is releasably secured to the base member by means of the securing bolts 25, FIGURE 4. The sealing plate includes the tubular part 26 which provides the entrance opening 27, the said opening having a diameter large enough to accommodate the power cable to be terminated. The sealing plate serves to clamp the resilient flexible diaphragm 28 to the base member. The diaphragm is gripped around its periphery between the sealing plate 24 and the reinforced portion 16 of the base member and a central opening 30 is provided therein through which the cable is inserted. In order to close the opening 30 so as to retain the compound within the terminator until the cable is inserted, a plastic film or sheet 31, FIGURE 1, is also clamped by the sealing plate in the same manner as the diaphragm is clamped. The plastic film is located to the inside of the diaphragm and the same is in full contact with the diaphragm. The material of the plastic film is not critical so long as a durable and non-porous plastic is employed having sufficient strength to close and seal the opening 30 from any leakage of the compound from the terminator. The plastic film 31 must also prevent the entrance of moisture and contaminates which would destroy the efficiency of the insulating compound prior to the installation of the power cable. The clamping of the diaphragm and also the clamping of the plastic film is accomplished by the securing bolts 25 which bolt the sealing plate to the base member. Thus the parts are effectively sealed around the periphery of the base member.

The material of the diaphragm 28 has been especially selected so as to afford the greatest possible protection against the environmental degradation such as ultraviolet radiation, ozone attack and oxidation. A high strength silicone elastomer is preferred for the diaphragm and any such elastomer as may be employed should provide a completely compatable system capable of operating at temperatures of minus twenty degrees Fahrenheit.

The terminator is also equipped with a stress relief contact shield 34 which is factory mounted in the device. The shield is preferably of beryllium copper, although other conductive and springy metals may be employed. The shield consists of a continuous outside wall and a resilient inside wall formed by the integral spring fingers 35 which are bent outwardly at their bottom ends as at 36. This specially formed contour as regards the contact shield is desirable since it facilitates the insertion of the cable within the terminator and also provides electrical grounding contact between the shield and the cable over shield when the cable has been fully inserted.

The contact shield is supported in place within the terminator by the standards 37 which are fixed to the outside cylindrical wall of the shield at one end and secured at their base end to the reinforced portion 16 by means of the rivets 38. Two or more of the supporting standards 37 are required and it will be understood that the standards not only support the contact shield 34 within the terminator but also electrically ground the shield to the metal base of the terminator.

The factory assembled terminator also includes the elastomeric closed cell sponge element 40 which is located within the base member having encircling relation with the contact shield. The sponge element has substantially the shape of a split collar and said element effectively compensates for the thermal expansion of the insulating compound and also that of the cable insulation due to temperature changes and load variations.

At the end of the terminator opposite the entrance end the insulator 10 is capped with a hoodnut 41 which provides the exterior electrical connecting means 42, FIGURE 1, for the cable conductor. The inwardly projecting extension 43 of the hoodnut is threaded for receiving the adaptor 44 having the sloping surfaces 45. Also, said extension is tubular and the slots 46 are formed in its inside surface to facilitate flow of the insulating compound during insertion of the connector 54 into the hoodnut during the installation of the cable. For electrically connecting the end of the inserted cable, the hoodnut is provided with a suitable sealable set screw 47. The gasket 48 which is confined between the hoodnut 41 and the insulator 10 functions to seal this end of the terminator assembly.

FIGURE 1 shows the terminator of the invention as it is assembled in the factory and with the interior thereof completely filled with the insulating compound. Although the diaphragm 28 has an opening 30 formed therein the said opening is sealed by the film 31 which retains the compound within the terminator. A preferred compound may consist of a blended mixture of high molecular weight polybutenes and low molecular weight polyolefins, together with an inhibitor. Since the compound is subjected to high voltage throughout its service life, the compound must be blended and packaged free of contamination. The compound is further characterized by having a high tack value to the polyethylene insulation, to the porcelain shell of the terminator and also to the metal of the contact shield down to temperatures as low as minus twenty degrees Fahrenheit. The filling compound should also retain its flexibility at low temperature levels.

FIGURE 2 shows the prepared end of a power cable 50 of the plastic insulated type wherein the semi-conducting jacket 51 of the cable has been removed from the cable end for a specified distance to expose the cable insulation 52. At the terminal end, the cable insulation 52 has been removed to expose the metal conductor 53 and this exposed portion of the conductor is fitted with a compression connector 54. When said connector is in place and the cable insulation end edge is suitably chamfered, the cable is ready for insertion within the factory assembly terminator. It will be understood that insertion takes place in the field and at the job site, since the terminator is shipped from the factory fully assembled and prefilled. The procedures for inserting the cable and in completing the termination structure is shown in FIGURES 3 and 4. The plug 23 is first of all removed so that excess compound may be released from within the terminator. The prepared end of the cable is then inserted in the opening 30 of the diaphragm 28, with the connector 54 breaking through the plastic film 31 and then passing through the contact shield 34. The elastomeric diaphragm maintains a running seal with the cable end and as penetration continues an equal amount of the insulating compound is displaced and discharged from the opening 22, all as indicated in FIGURE 3 by the numeral 55. A container 56 may be employed for collecting the displaced compound. Since the compound is tacky in nature and under pressure, it will cling to the surface of the cable insulation, thus leaving no voids or trapped air bubbles.

Further insertion of the cable will bring the end of the connector 54 into contact with the adaptor 44. The sloping surfaces 45 of the adaptor facilitate the operation of inserting the cable since the connector is directed into the hollow extension 43 of the hoodnut. When the cable insertion is completed the opening 22 is again closed by the plug 23 and electrical connection of the parts is assured by screwing the set screw 47 down into contact with the inserted connector. This also locks the hoodnut to the cable. With the securing of the concentric wires 57 of the cable, FIGURES 2 and 4, by the clamp 58 which clamps the cable wires to the sealing plate 24, the termination of the cable is completed.

The opening 30 in the diaphragm 28 is purposely made smaller than the diameter of the cable jacket to which it is to be applied. The size of the hole depends upon the amount of ultimate elongation desired when the diaphragm is telescoped over the cable. Since a smaller hole is provided the opening is thus placed in tension and accordingly a close and tight fit is provided for effectively sealing the cable entrance end of the termination structure.

When the cable is fully inserted it will be observed that the contact shield 34 is in direct electrical contact with the cable semi-conducting jacket 51. The installed position of the contact shield and the special contour of the inside spring fingers 35 results in this electrical grounding of the cable and which is effected automatically with the insertion of the cable. The obvious advantage of employing the contact shield, and which is made possible by the insulating compound, resides in the elimination of the construction time for the usual tape stress relief cone and also in the elimination of the dependency of the installation personnel in the field in building up the stress relief cone to the proper dimensions and shape.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. A terminator device which is factory assembled, in combination, a cylindrical shell of insulating material having a cylindrical base portion of metal fixedly secured to one end thereof, a sealing plate secured to the base portion and having a central opening for accommodating the end of a power cable adapted to be inserted through the sealing plate and through the base portion and insulator shell, a diaphragm having a central opening which is confined between the base portion and sealing plate so as to form a seal with the parts, the opening in the diaphragm having axial alignment with the opening in the sealing plate, a plastic film located between the diaphragm and to the base portion and which is confined in the same manner as the diaphragm, said plastic film sealing the opening in the diaphragm and thus sealing the entrance end of the terminator device, a hoodnut fixed to the opposite end of the terminator device, and sealing this end of the device, a stress relief contact shield located within the base portion and being fixed to the base portion in axial alignment with the opening in the diaphragm, and an insulating compound of a plastic nature filling the interior of the terminator device so as to eliminate all voids and being free of air bubbles.

2. A terminator device which is factory assembled as defined by claim 1, additionally including an adaptor located within the insulator shell and being supported by the hoodnut, said adaptor having sloping surfaces which are inclined so as to facilitate the insertion of the end of the cable into the hoodnut.

3. A terminator device which is factory assembled as defined by claim 1, additionally including an elastomeric closed cell sponge element having location within the interior of the terminator device whereby to compensate for the thermal expansion of the insulating compound and also that of the cable insulation due to temperature changes and load variations.

4. A terminator device which is factory assembled as defined by claim 1, wherein the stress relief contact shield is supported by the base portion and electrically grounded thereby, and wherein said contact shield consists of a metal ring having the shape of an inverted U in section, with a continuous outer wall and an inner wall formed of a plurality of spring fingers.

5. In a method of terminating a power cable, which consists in the steps of preparing the terminal end of the power cable for insertion in a factory assembled terminator device prefilled with an insulating compound and which is sealed within the device, inserting the prepared end of the cable within the device by rupturing the seal at the entrance end, continuing the insertion of the cable end so that the same passes through a stress relief contact shield located within the device and fixedly supported in axial alignment with the entrance opening, whereby the contact shield will have telescoping relation on the prepared end of the cable, allowing the excess compound to discharge from the device through an opening provided for the purpose, continuing the insertion of the cable until the end of the same makes electrical contact with a hoodnut at the sealed end of the pothead device opposite the entrance end, and then closing and sealing the discharge opening to retain the remainder of the compound within the terminator device.

6. A method of terminating a power cable as defined by claim 5, wherein the prepared end of the cable is inserted in the terminator device by passing the prepared end through an opening provided in a diaphragm of elastomeric material located at the entrance end of the device, whereupon the cable end then ruptures the seal at the entrance end, said opening having a diameter smaller than that of the power cable whereby the diaphragm maintains a running seal with the cable during insertion and wherein the periphery of the opening is thereafter in tension for sealing the entrance end of the terminator device with respect to the cable.

No references cited.

LARAMIE E. ASKIN, *Primary Examiner.*